(12) United States Patent
Nada

(10) Patent No.: US 6,574,546 B2
(45) Date of Patent: Jun. 3, 2003

(54) APPARATUS FOR LEARNING FULL-CLOSED POSITION OF ACCELERATOR PEDAL AND METHOD OF THE SAME

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 274 days.

(21) Appl. No.: 09/839,203

(22) Filed: Apr. 23, 2001

(65) Prior Publication Data

US 2001/0039939 A1 Nov. 15, 2001

(30) Foreign Application Priority Data

May 12, 2000 (JP) ........................................ 2000-139574

(51) Int. Cl.$^7$ ........................... G06F 19/00; F02D 41/00
(52) U.S. Cl. ........................ 701/110; 701/115; 701/114; 123/399
(58) Field of Search ............................... 701/110, 114, 701/115, 102; 123/361, 399; 73/117.3, 116, 118.1

(56) References Cited

U.S. PATENT DOCUMENTS

| | | | | |
|---|---|---|---|---|
| 4,586,403 A | | 5/1986 | Lee et al. ................... | 123/480 |
| 5,060,744 A | * | 10/1991 | Katoh et al. ................ | 123/361 |
| 5,161,505 A | | 11/1992 | Bederna et al. ............. | 123/399 |
| 5,367,997 A | * | 11/1994 | Kawamura et al. ......... | 123/399 |
| 5,578,749 A | | 11/1996 | Mogaki ...................... | 73/118.1 |
| 5,883,481 A | | 3/1999 | Ito et al. ..................... | 318/445 |
| 6,027,425 A | * | 2/2000 | Sakaguchi et al. ............ | 477/48 |
| 6,488,007 B2 | * | 12/2002 | Satou et al. ................. | 123/396 |

FOREIGN PATENT DOCUMENTS

| FR | 2 616 848 A1 | 12/1988 |
|---|---|---|
| JP | 4-22746 A | 1/1992 |
| JP | 4-41944 A | 2/1992 |
| WO | WO 98/00634 A2 | 1/1998 |

* cited by examiner

Primary Examiner—Hieu T. Vo
(74) Attorney, Agent, or Firm—Oliff & Berridge, PLC

(57) ABSTRACT

The technique of the present invention enables a full closed position of an accelerator pedal to be learnt with a high accuracy. More specifically the arrangement of the invention effectively prevents the full closed position of the accelerator pedal from being mistakenly learnt and quickly changes a current full closed position of the accelerator pedal to a new, more appropriate full closed position. In a system of the present invention, a master controller updates a full-closed position accelerator opening θclosed when an accelerator open flag Fopen is set ON and when a current accelerator opening θn is less than a learning permission accelerator opening θlok and monotonously decreases to be converged. The master controller sets the converged accelerator opening θn to a new full-closed position accelerator opening θclosed when the converged accelerator opening θn is greater than a current full-closed position accelerator opening θclosed. The master controller sets a remainder obtained by subtracting a predetermined value from the current full-closed position accelerator opening θclosed to the new full-closed position accelerator opening θclosed when the converged accelerator opening θn is not greater than the current full-closed position accelerator opening θclosed.

30 Claims, 11 Drawing Sheets

APPARATUS FOR LEARNING FULL-CLOSED POSITION OF ACCELERATOR PEDAL AND METHOD OF THE SAME

BACKGROUND OF THE INVENTION

1. Field of the Invention

The present invention relates to a method of learning the full-closed position of an accelerator pedal disposed in a vehicle, and an apparatus for the same.

2. Description of the Related Art

The driver regulates the output of a vehicle via an accelerator pedal during a drive of the vehicle. It is accordingly required for an accelerator opening sensor or a throttle opening sensor, which measures the depression amount of the accelerator pedal, to transmit an appropriate required output value corresponding to a driver's depression amount of the accelerator pedal. In the case where some required output value is transmitted from the accelerator opening sensor while the driver's depression amount of the accelerator pedal is equal to zero, the vehicle is undesirably accelerated, regardless of the driver's requirement to maintain the current vehicle speed or to even reduce the vehicle speed. The learning technique has accordingly be proposed to change a reference output value of the accelerator opening sensor corresponding to the depression amount of zero (that is, a full closed position of the accelerator pedal) to a more appropriate value.

The prior art technique learns the reference output value of the accelerator opening sensor on the premises that an idle switch is set ON and that the output value of the accelerator opening or throttle opening is stable. This arrangement may cause the reference output value of the accelerator opening sensor to be changed while the depression amount of the accelerator pedal is not equal to zero. In other words, this arrangement may cause the full closed position of the accelerator pedal to be mistakenly learnt. The prior art technique sets a processed value obtained by leveling the difference between a current reference output value and a newly determined reference output value or another processed value obtained by adding or subtracting a predetermined value to or from the current reference output value to the target reference output value of the accelerator opening sensor. This does not always set the optimum value to the target reference output value of the accelerator opening sensor and thereby has a relatively low learning accuracy.

SUMMARY OF THE INVENTION

The object of the present invention is accordingly to provide a technique that effectively prevents a full closed position of an accelerator pedal from being mistakenly learnt and quickly changes a current full closed position of the accelerator pedal to a new, more appropriate full closed position, thus enabling the full closed position of the accelerator pedal to be learnt with a high accuracy.

At least part of the above and the other related objects is attained by a method of learning a full-closed position output value at a full closed position of an accelerator pedal disposed in a vehicle. Here the accelerator pedal enables a required output value to be output to a driving power source of the vehicle in a continuously variable manner and has the full closed position that corresponds to a required output value of 0. The method includes determining whether an output value of the accelerator pedal has exceeded a first threshold value; determining whether the output value of the accelerator pedal is less than a second threshold value, which is smaller than the first threshold value, after the output value of the accelerator pedal has exceeded the first threshold value; when it is determined that the output value of the accelerator pedal is less than the second threshold value, determining whether the output value of the accelerator pedal is converging; and when it is determined that the output value of the accelerator pedal is converging, changing the full-closed position output value to a new full-closed position output value by taking into account the converged output value of the accelerator pedal.

This method of the present invention varies the full-closed position output value by taking into account the converged output value of the accelerator pedal, when it is determined that the output value of the accelerator pedal has exceeded the first threshold value and that the output value of the accelerator pedal is converging. This arrangement effectively prevents the full closed position of the accelerator pedal from being mistakenly learnt and quickly changes the current full closed position of the accelerator pedal to a new, more appropriate full closed position, thus enabling the full closed position of the accelerator pedal to be learnt with a high accuracy. Here the first threshold value is close to a relatively high output value corresponding to a frequently used accelerator position, whereas the second threshold value is close to an output value corresponding to the full closed position of the accelerator pedal.

In accordance with one preferable application of the method of the present invention, determining whether the output value of the accelerator pedal is converging is carried out when the output value of the accelerator pedal monotonously decreases. In accordance with another preferable application of the method of the present invention, determining whether the output value of the accelerator pedal is converging is carried out when a current full-closed position output value is greater than a currently observed output value of the accelerator pedal. Determining whether the output value of the accelerator pedal is converging is carried out on the condition that the output value of the accelerator pedal monotonously decreases, when the current full-closed position output value is not greater than the currently observed output value of the accelerator pedal.

In accordance with one embodiment that attains either one of the above preferable applications, it is determined that the output value of the accelerator pedal monotonously decreases when an absolute difference between a currently observed output value of the accelerator pedal and a previous output value of the accelerator pedal is within a preset range and when a future output value of the accelerator pedal after elapse of a predetermined time period is smaller than the currently observed output value of the accelerator pedal. This arrangement enables learning to be performed even when minute peaks appear due to a simple noise, thus increasing the frequency of learning and enhancing the learning effects. Here the predetermined time period is longer than a sampling time required to detect a variation in output value of the accelerator pedal and is suitable to specify the general characteristics of the output value of the accelerator pedal. In accordance with another embodiment that attains either one of the above preferable applications, it is determined that the output value of the accelerator pedal monotonously decreases when the currently observed output value of the accelerator pedal is smaller than the previous output value of the accelerator pedal. In this embodiment, the continuous decrease in output value of the accelerator pedal is required for the determination that the output value of the accelerator pedal monotonously decreases. Namely learning is not performed when any peak appears due to a noise. This arrangement effectively prevents the full closed position of the accelerator pedal from being mistakenly learnt. In this arrangement, the term 'monotonous decrease' is not restricted to the strict sense that does not allow any increasing variation but means a substantially monotonous decrease that allows minute increasing variations, for example, due to the noise.

In the method of the present invention, it may be determined that the output value of the accelerator pedal is converging when a variation in output value of the accelerator pedal is within a predetermined range. This arrangement enhances the speed of determination with regard to the convergence of the output value of the accelerator pedal.

In the method of the present invention, it may be determined that the output value of the accelerator pedal is converging when the currently observed output value of the accelerator pedal is either identical with the previous output value of the accelerator pedal or less than the previous output value of the accelerator pedal by a predetermined rate. This arrangement does not allow learning to be performed when any peak appears due to a noise, thus effectively preventing the full closed position of the accelerator pedal from being mistakenly learnt due to the noise. In accordance with one preferable embodiment of the method of the present invention, when a current full-closed position output value is greater than the converged output value of the accelerator pedal, a remainder obtained by subtracting a predetermined value from the current full-closed position output value is set to the new full-closed position output value.

In accordance with another preferable embodiment of the method of the present invention, when a current full-closed position output value is not greater than the converged output value of the accelerator pedal, a sum obtained by adding a predetermined value to the current full-closed position output value is set to the new full-closed position output value. In this embodiment, when the convergence of the output value of the accelerator pedal continues for a predetermined time period, the converged output value of the accelerator pedal is set to the new full-closed position output value. This arrangement quickly sets the actual full closed position of the accelerator pedal to the new full-closed position output value, thus enhancing the learning accuracy.

In accordance with still another preferable embodiment of the method of the present invention, when a current full-closed position output value is not greater than the converged output value of the accelerator pedal, the converged output value of the accelerator pedal is set to the new full-closed position output value. This arrangement quickly sets the actual full closed position of the accelerator pedal to the new full-closed position output value, thus enhancing the learning accuracy. In accordance with another preferable embodiment of the method of the present invention, the output value of the accelerator pedal is expressed by an accelerator opening that is related to a depression amount of the accelerator pedal, the accelerator opening being a predetermined percent at a maximum output value of the accelerator pedal and being zero percent at a minimum output value of the accelerator pedal. In accordance with still another preferable embodiment of the method of the present invention, the output value of the accelerator pedal is expressed by a throttle opening that is related to a depression amount of the accelerator pedal, the throttle opening being a predetermined percent at a maximum output value of the accelerator pedal and being zero percent at a minimum output value of the accelerator pedal. Here the predetermined percent represents a preset accelerator opening or throttle opening that is assured even after the accelerator pedal has undergone a time variation, for example, a value in a range of approximately 55% to 70%.

In accordance with another preferable application of the present invention, the method further includes the step of: informing a driver of occurrence of an abnormality on the accelerator pedal when the new full-closed position output value is smaller than the second threshold value but greater than a third threshold value, which is smaller than the second threshold value and corresponds to a mechanical full closed position of the accelerator pedal. This arrangement efficiently detects an abnormality of the accelerator pedal and informs the driver of occurrence of the abnormality in the course of learning the full closed position of the accelerator pedal.

The present invention is also directed to a method of successively updating a full-closed position output value of an accelerator pedal at a full closed position corresponding to a specific state in which an operating quantity of the accelerator pedal is equal to zero. The method includes the steps of: determining whether an output value of the accelerator pedal is less than a threshold value; when it is determined that the output value of the accelerator pedal is less than the threshold value, determining whether the output value of the accelerator pedal is converging; when it is determined that the output value of the accelerator pedal is converging, comparing a current full-closed position output value of the accelerator pedal with the converged output value of the accelerator pedal; when the current full-closed position output value of the accelerator pedal is greater than the converged output value of the accelerator pedal, setting a mean of the current full-closed position output value of the accelerator pedal and the converged output value of the accelerator pedal to a new full-closed position output value of the accelerator pedal; and when the current full-closed position output value of the accelerator pedal is not greater than the converged output value of the accelerator pedal, setting the converged output value of the accelerator pedal to the new full-closed position output value of the accelerator pedal.

This updating method of the present invention sets the converged output value of the accelerator pedal to the new full-closed position output value of the accelerator pedal when the current full-closed position output value of the accelerator pedal is not greater than the converged output value of the accelerator pedal. This arrangement enhances the learning accuracy at least in a range of high output values of the accelerator pedal.

In accordance with one preferable application of the updating method of the present invention, when the current full-closed position output value of the accelerator pedal is not greater than the converged output value of the accelerator pedal, the mean of the current full-closed position output value of the accelerator pedal and the converged output value of the accelerator pedal is set to the new full-closed position output value of the accelerator pedal. When a convergence time period, in which the output value of the accelerator pedal converges, exceeds a preset time period, the converged output value of the accelerator pedal is set to the new full-closed position output value of the accelerator pedal. This arrangement effectively prevents the full closed position of the accelerator pedal from being mistakenly learnt, while enhancing the learning accuracy at least in a range of high output values of the accelerator pedal.

In the updating method, the output value of the accelerator pedal may be obtained as either one of an accelerator opening or a throttle opening that is related to a depression amount of the accelerator pedal.

The present invention is further directed to a full-closed position learning apparatus that learns a full closed position of an accelerator pedal in a released state. More specifically the full-closed position learning apparatus outputs a depression amount of the accelerator pedal as an accelerator opening and learns the accelerator opening at the full closed position of the accelerator pedal, which has the full closed position corresponding to a depression amount of zero. The full-closed position learning apparatus includes: an accelerator depression measurement unit that measures a depression amount of the accelerator pedal as an operational opening; a first storage unit that registers therein an accelerator open record when the observed operational opening exceeds an open record reference value; a learning permission decision unit that determines whether the observed operational opening is less than a learning permission reference value, which is smaller than the open record reference value; an opening convergence decision unit that determines whether the operational opening is converging when it is determined that the observed operational opening is less than the learning permission reference value while the accelerator open record is present in the first storage unit; and a full-closed position opening variation unit that varies the operational opening at the full closed position to a new full-closed position operational opening by taking into account the converged operational opening, when it is determined that the operational opening is converging.

The full-closed position learning apparatus of the present invention varies the operational opening at the full closed position to the new full-closed position operational opening by taking into account the converged operational opening, when it is determined that the observed operational opening is less than the learning permission reference value while the accelerator open record is present in the first storage unit and that the operational opening is converging. This arrangement effectively prevents the full closed position of the accelerator pedal from being mistakenly learnt and updates the current full-closed position operational opening to a new, more appropriate operational opening.

In accordance with one preferable embodiment of the present invention, the full-closed position learning apparatus further includes a decreasing state decision unit that determines whether the operational opening monotonously decreases, when the accelerator open record is present in the first storage unit. In this embodiment, the opening convergence decision unit carries out the determination of whether the operational opening is converging when it is determined that the operational opening monotonously decreases.

In the above preferable embodiment, the decreasing state decision unit may determine that the operational opening monotonously decreases when an absolute difference between a currently observed operational opening and a previous operational opening is within a preset range and when a future operational opening after elapse of a predetermined time period is smaller than the currently observed operational opening. Here the predetermined time period is longer than a sampling time required to detect a variation in operational opening and is suitable to specify the general characteristics of the operational opening. In the above preferable embodiment, the decreasing state decision unit may alternatively determine that the operational opening monotonously decreases when a currently observed operational opening is smaller than a previous operational opening. In accordance with one preferable application of the full-closed position learning apparatus, the opening convergence decision unit determines that the operational opening is converging when a variation in operational opening is within a predetermined range.

In accordance with another preferable application of the full-closed position learning apparatus, the opening convergence decision unit determines that the operational opening is converging when a currently observed operational opening is either identical with a previous operational opening or less than the previous operational opening by a predetermined rate. In accordance with still another preferable application of the full-closed position learning apparatus, the full-closed position opening variation unit sets a remainder obtained by subtracting a predetermined value from a current full-closed position operational opening to the new full-closed position operational opening, when the current full-closed position operational opening is greater than the converged operational opening.

In accordance with another preferable application of the full-closed position learning apparatus, the full-closed position opening variation unit sets a sum obtained by adding a predetermined value to a current full-closed position operational opening to the new full-closed position operational opening, when the current full-closed position operational opening is not greater than the converged operational opening. In this application, the full-closed position opening variation unit sets the converged operational opening to the new full-closed position operational opening when the convergence of the operational opening continues for a predetermined time period.

In accordance with still another preferable application of the full-closed position learning apparatus, the full-closed position opening variation unit sets the converged operational opening to the new full-closed position operational opening when a current full-closed position operational opening is not greater than the converged operational opening.

In one preferable embodiment of the present invention, the full-closed position learning apparatus further includes: an accelerator abnormality decision unit that compares the new full-closed position operational opening with the learning permission reference value and with a mechanical full closing value, which is smaller than the learning permission reference value and corresponds to a mechanical full closed position of the accelerator pedal; and an information unit that informs a driver of occurrence of an abnormality on the accelerator pedal when the new full-closed position operation opening is smaller than the learning permission reference value but is greater than the mechanical full closing value. This arrangement enables an abnormality of the accelerator pedal to be detected, simultaneously with learning the full closed position of the accelerator pedal.

In the full-closed position learning apparatus of the present invention, the accelerator depression measurement unit may be an accelerator opening sensor that measures the depression amount of the accelerator pedal as an accelerator opening, or may alternatively be a throttle opening sensor that measures an operation amount of a throttle value, which works in combination with an operation of the accelerator pedal, as a throttle opening. In either case, the depression amount of the accelerator pedal can be obtained.

The full-closed position learning apparatus exerts the essentially equivalent functions and effects to those of the learning method of the present invention discussed above, while attaining the individual functions and effects by means of each individual constituent of the apparatus.

These and other objects, features, aspects, and advantages of the present invention will become more apparent from the following detailed description of the preferred embodiments with the accompanying drawings.

DESCRIPTION OF THE PREFERRED EMBODIMENTS

Some modes of carrying out the present invention are discussed below as preferred embodiments.

A. General Structure of Hybrid Vehicle

Figure 1:
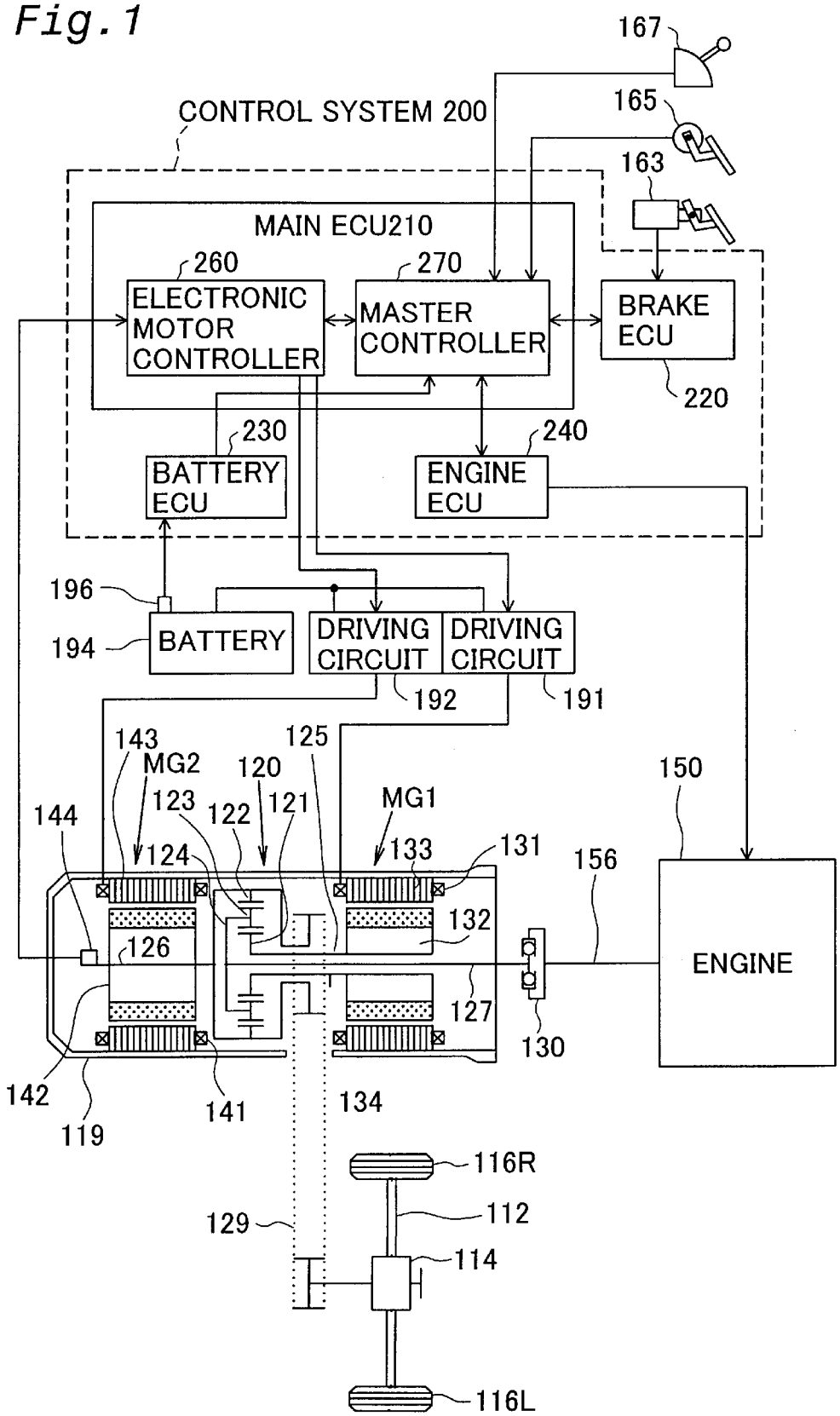
FIG. 1 schematically illustrates the general structure of a hybrid vehicle in one embodiment of the present invention.

FIG. 1 schematically illustrates the general structure of a hybrid vehicle in one embodiment of the present invention. The hybrid vehicle has three prime movers, that is, one engine 150 and two motor generators MG1 and MG2. Here the motor generator represents the prime mover functioning as both a motor and a generator In the description hereinafter, for simplicity of explanation, the motor generators are simply referred to as the motors. The hybrid vehicle is under the control of a control system 200.

The control system 200 includes a main ECU 210, a brake ECU 220, a battery ECU 230, and an engine ECU 240. Each of these ECUs is constructed as an integral unit, where a plurality of circuit elements including a microcomputer, an input interface, and an output interface are arranged on one identical circuit board. The main ECU 210 includes a motor controller 260 and a master controller 270. The master controller 270 functions to determine a variety of control-relating quantities, for example, distribution of the output from the three prime movers 150, MG1, and MG2.

The engine 150 is an ordinary gasoline engine that explosively combusts gasoline as fuel and rotates a crankshaft 156 with the combustion energy. The engine ECU 240 controls operations of the engine 150. The engine ECU 240 regulates the quantity of fuel injection into the engine 150, the ignition timing, and other required quantities in response to instructions transmitted from the master controller 270.

The motors MG1 and MG2 are constructed as synchronous motors, and respectively include rotors 132 and 142 with a plurality of permanent magnets mounted on outer circumferences thereof, and stators 133 and 143 with three-phase coils 131 and 141 wound thereon to form revolving magnetic fields. The stators 133 and 142 are fixed to a casing 119. The three-phase coils 131 and 141 wound on the stators 133 and 143 of the motors MG1 and MG2 are respectively connected to a secondary battery 194 via driving circuits 191 and 192. Each of the driving circuits 191 and 192 is constructed as a transistor inverter including a pair of transistors for each phase as switching elements. The driving circuits 191 and 192 are controlled by the motor controller 260. When the transistors in the driving circuit 191 or in the driving circuit 192 are switched on in response to a control signal transmitted from the motor controller 260, the electric current runs between the battery 194 and the motor MG1 or the motor MG2. Each of the motors MG1 and MG2 may function as the motor that receives a supply of electric power from the battery 194 to be driven and rotated (hereinafter this state of operation is referred to as the power operation). While the rotor 132 or 142 is rotated by an external force, the motor MG1 or MG2 may function as the generator that causes an electromotive force to be generated between both ends of the three-phase coils 131 or 141 and charges the battery 194. Strictly speaking, this corresponds to power generation in the case where the output of the engine 150 works as the external force, and corresponds to regeneration in the case where braking force works as the external force. In this embodiment, these two states of operation are collectively referred to as the regenerative operation.

The rotating shafts of the engine 150 and the motors MG1 and MG2 are mechanically linked with one another via a planetary gear 120. The planetary gear 120 includes a sun gear 121, a ring gear 122, and a planetary carrier 124 with a planetary pinion gear 123. In the hybrid vehicle of the embodiment, the crankshaft 156 of the engine 150 is coupled with a planetary carrier shaft 127 via a damper 130. The damper 130 is provided to absorb torsional vibrations arising in the crankshaft 156. The rotor 132 of the motor MG1 is linked with a sun gear shaft 125, whereas the rotor 142 of the motor MG2 is linked with a ring gear shaft 126. The rotation of the ring gear 122 is transmitted to an axle 112 and wheels 116R and 116L via a chain belt 129 and a differential gear 114.

The control system 200 utilizes a diversity of sensors to attain the control of the whole hybrid vehicle. Such sensors include an accelerator sensor 165 that measures the step-on amount of an accelerator pedal by a driver, a gearshift position sensor 167 that detects the position of a gearshift lever, a brake sensor 163 that measures the step-on pressure of a brake pedal, a throttle sensor 169 that measures the opening of a throttle valve 168 for regulating the quantity of air intake into the engine 150, a battery sensor 196 that measures the charge level of the battery 194, and a speed sensor 144 that measures the revolving speed of the motor MG2. The ring gear shaft 126 is mechanically linked with the axle 112 via the chain belt 129, so that the ratio of the revolving speeds of the ring gear shaft 126 to the axle 112 is fixed. The speed sensor 144 disposed on the ring gear shaft 126 accordingly detects the revolving speed of the axle 112 as well as the revolving speed of the motor MG2.

B. Basic Operations in Hybrid Vehicle

The description first regards the operations of the planetary gear 120 to explain the basic operations in the hybrid vehicle. In the planetary gear 120, when the revolving speeds of any two rotating shafts among the three rotating shafts mentioned above are specified, the revolving speed of the residual rotating shaft is automatically determined. The revolving speeds of the respective rotating shafts hold the relationship defined as Equation (1) given below:

$$Nc = Ns \times \rho/(1+\rho) + Nr \times 1/(1+\rho) \quad (1)$$

where Nc, Ns, and Nr respectively denote the revolving speed of the planetary carrier shaft 127, the revolving speed of the sun gear shaft 125, and the revolving speed of the ring gear shaft 126, and ρ represents a gear ratio of the sun gear 121 to the ring gear 122 as expressed by the following equation:

$$\rho = [\text{number of teeth of sun gear 121}]/[\text{number of teeth of ring gear 122}]$$

The torques of the three rotating shafts hold fixed relations defined as Equations (2) and (3) given below, irrespective of their revolving speeds:

$$Ts = Tc \times \rho/(1+\rho) \quad (2)$$

$$Tr = Tc \times 1/(1+\rho) = Ts/\rho \quad (3)$$

where Tc, Ts, and Tr respectively denote the torque of the planetary carrier shaft 127, the torque of the sun gear shaft 125, and the torque of the ring gear shaft 126.

The functions of the planetary gear 120 enable the hybrid vehicle of the embodiment to run in a variety of conditions. For example, in the state of a drive at a relatively low speed immediately after the start of the hybrid vehicle, the motor MG2 carries out the power operation to transmit the power to the axle 112 and drive the hybrid vehicle, while the engine 150 is at a stop or at an idle.

When the speed of the hybrid vehicle reaches a predetermined level, the control system 200 causes the motor MG1 to carry out the power operation and motors and starts the engine 150 with the torque output through the power operation of the motor MG1. At this moment, the reactive torque of the motor MG1 is output to the ring gear 122 via the planetary gear 120.

When the engine 150 is driven to rotate the planetary carrier shaft 127, the sun gear shaft 125 and the ring gear shaft 126 rotate under the conditions fulfilling Equations (1) through (3) given above. The power generated by the rotation of the ring gear shaft 126 is directly transmitted to the wheels 116R and 116L. The power generated by the rotation of the sun gear shaft 125 is, on the other hand, regenerated as electric power by the first motor MG1. The power operation of the second motor MG2 enables the power to be output to the wheels 116R and 116L via the ring gear shaft 126.

In the state of a stationary drive, the output of the engine 150 is set substantially equal to a required power of the axle 112 (that is, the revolving speed×torque of the axle 112). In this state, part of the output of the engine 150 is transmitted directly to the axle 112 via the ring gear shaft 126, while the residual power is regenerated as electric power by the first motor MG1. The second motor MG2 utilizes the regenerated electric power to produce a torque for rotating the ring gear shaft 126. The axle 112 is accordingly driven at a desired revolving speed and a desired torque.

When there is an insufficiency of the torque transmitted to the axle 112, the second motor MG2 supplements the insufficient torque. The electric power obtained by the regenerative operation of the first motor MG1 and the electric power accumulated in the battery 194 are used for such supplement. In this manner, the control system 200 controls the operations of the two motors MG1 and MG2 according to the required power to be output from the axle 112.

The hybrid vehicle of the embodiment may go back in the active state of the engine 150. While the engine 150 is driven, the planetary carrier shaft 127 rotates in the same direction as that in the case of the forward drive. In this state, when the first motor MG1 is controlled to rotate the sun gear shaft 125 at a higher revolving speed than the revolving speed of the planetary carrier shaft 127, the rotating direction of the ring gear shaft 126 is inverted to the direction for the rearward drive as clearly understood from Equation (1) given above. The control system 200 makes the second motor MG2 rotated in the direction for the rearward drive and regulates the output torque, thus enabling the hybrid vehicle to go back.

In the planetary gear 120, the planetary carrier 124 and the sun gear 121 may be rotated while the ring gear 122 is at a stop. The engine 150 is accordingly driven while the vehicle is at a stop. For example, when the battery 194 has a low charge level, the engine 150 is driven and causes the first motor MG1 to carry out the regenerative operation and charge the battery 194. The power operation of the first motor MG1 in the stationary state of the vehicle, on the other hand, motors and starts the engine 150 with the output torque.

C. Structure of Control System

Figure 2:
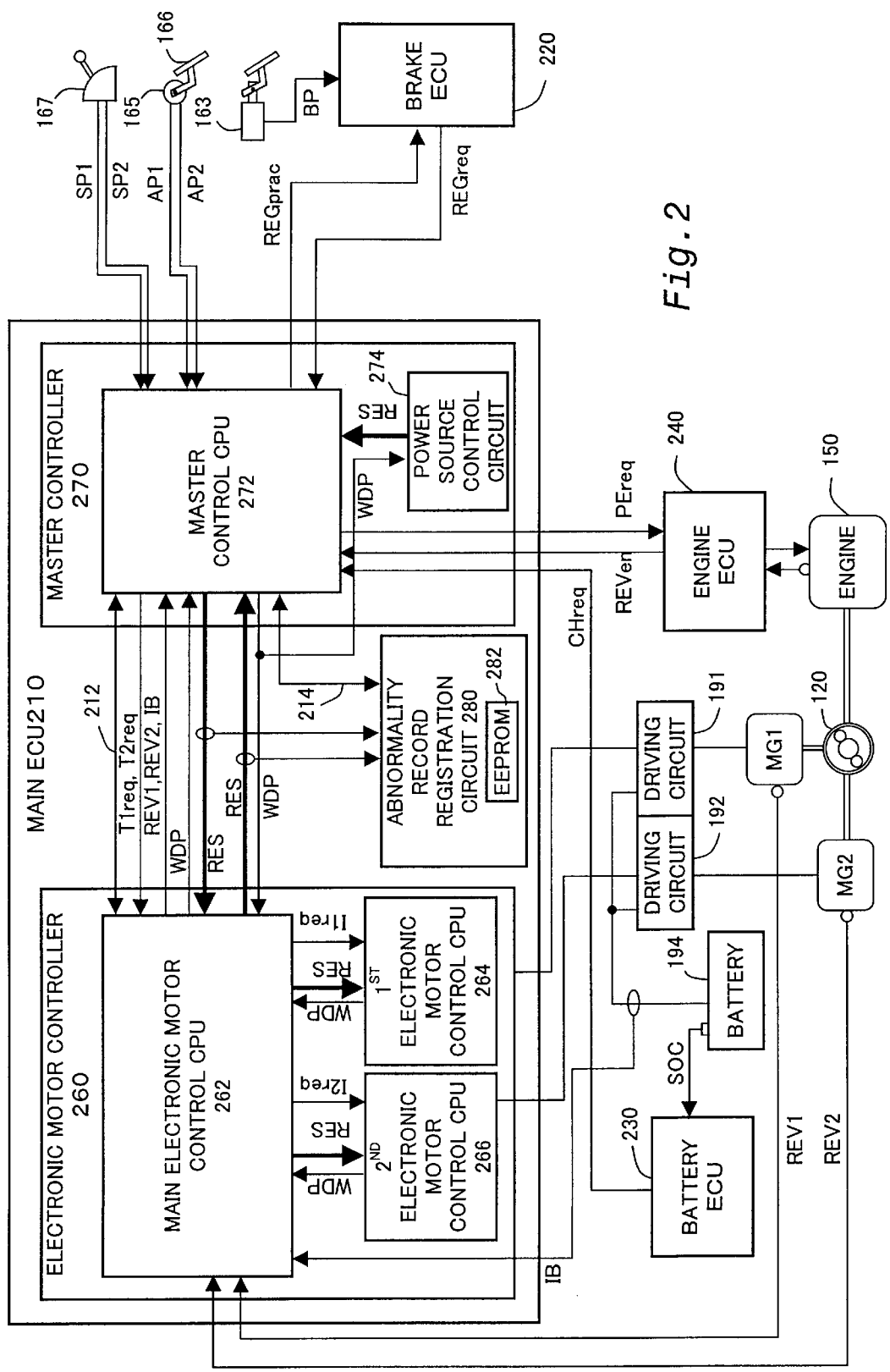
FIG. 2 is a block diagram illustrating the detailed configuration of a control system that controls the hybrid vehicle shown in FIG. 1.

FIG. 2 is a block diagram illustrating the detailed configuration of the control system 200 in the embodiment. The master controller 270 includes a master control CPU 272 and a power source control circuit 274. The motor controller 260 includes a main motor control CPU 262 and two motor control CPUs 264 and 266 that respectively control the two motors MG1 and MG2. Each of the CPUs is constructed as a one-chip microcomputer including a CPU, a ROM, a RAM, an input port, and an output port (not shown).

The master control CPU 272 functions to determine the control-relating quantities, for example, the distribution of the revolving speeds and the torques of the three prime movers 150, MG1, and MG2 and transmit a diversity of required values to the other CPUs and ECUs, so as to control the operations of the respective prime movers. In order to attain such control, the master control CPU 272 receives accelerator position signals AP1 and AP2 representing the accelerator position or accelerator opening and gearshift position signals SP1 and SP2 representing the gearshift position. The accelerator sensor 165 includes a sliding resistance therein and outputs a voltage corresponding to a depression or step-on amount of the accelerator pedal 166 as the accelerator position signals AP1 and AP2.

Figure 3:
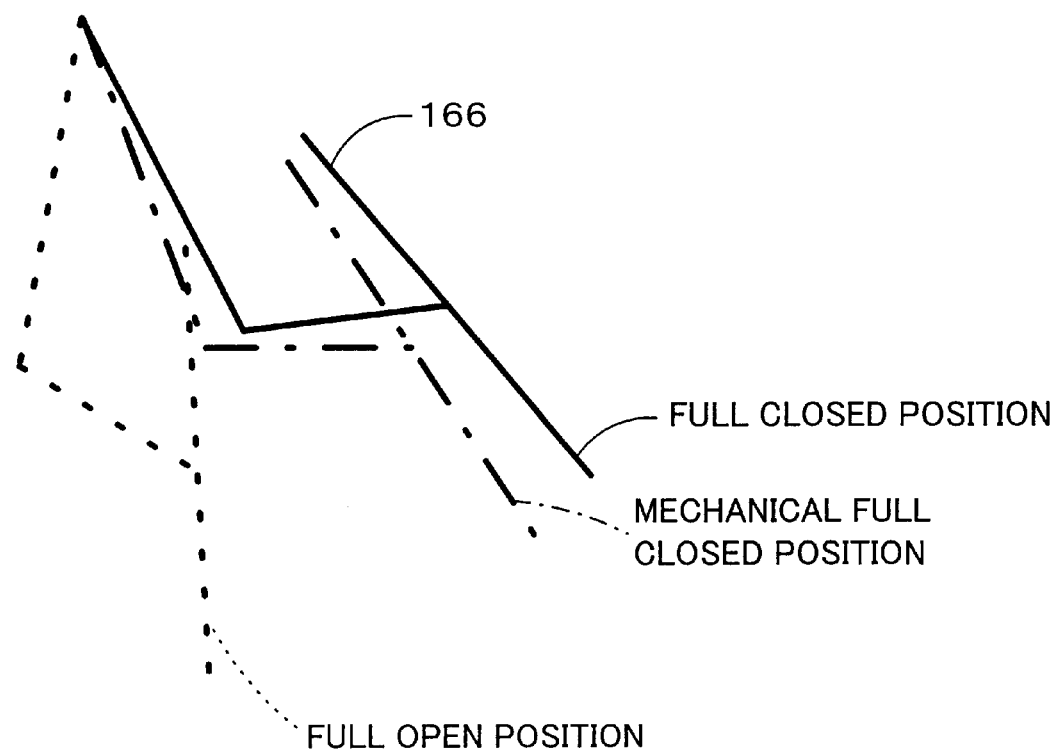
FIG. 3 shows the definition of the positions of an accelerator pedal.

The position of the accelerator pedal 166 used in this embodiment is discussed below with referring to FIG. 3. FIG. 3 shows the definition of the positions of the accelerator pedal 166. In the structure of the embodiment, the voltage output from the accelerator sensor 165 increases with an increase in depression or step-on amount of the accelerator pedal 166 and reaches its maximum at a full open position (that is, a position shown by the broken line in FIG.

3). The accelerator pedal 166 has a mechanical full closed position (that is, a position shown by the one-dot chain line in FIG. 3), which is determined by the structure. The depression or step-on amount of the accelerator pedal 166 (that is, the output of the accelerator pedal 166 via the accelerator sensor 165) is commonly called the accelerator opening. When the depression amount of the accelerator pedal 166 is equal to zero (this is the state shown by the solid line in FIG. 3, in which the driver releases the accelerator pedal 166), the accelerator pedal 166 is set in the mechanical full closed position. This full closed position may be shifted, for example, with elapse of time. The voltage output from the accelerator sensor 165 varies with the shift of the full closed position. The technique of the embodiment thus carries out a process of successively varying the output voltage of the accelerator sensor 165, which is used for the determination of whether the accelerator pedal 166 is in the full closed position, to appropriate values, that is, a process of learning the full closed position of the accelerator pedal 166 as discussed later.

Both the accelerator sensor 165 and the gearshift position sensor 167 have a dual structure, that is, include two sensor elements. The master control CPU 272 accordingly receives the two accelerator position signals AP1 and AP2 and the two gearshift position signals SP1 and SP2.

The power source control circuit 274 is a DC-DC converter that converts the high-power d.c. voltage of the battery 194 into the low-power d.c. voltage used for the respective circuits included in the main ECU 210. The power source control circuit 274 also has the function of a monitoring circuit that monitors abnormality in the master control CPU 272.

The engine ECU 240 controls the engine 150 according to a required engine output PEreq given by the master control CPU 272. The engine ECU 240 feeds a revolving speed REVen of the engine 150 back to the master control CPU 272.

The main motor control CPU 262 transmits required electric currents I1req and I2req to the two motor control CPUs 264 and 266, based on required torques T1req and T2req of the two motors MG1 and MG2 given by the master control CPU 272. The motor control CPUs 264 and 266 respectively control the driving circuits 191 and 192 according to the required electric currents I1req and I2req, so as to drive the motors MG1 and MG2. The speed sensors of the motors MG1 and MG2 feed revolving speeds REV1 and REV2 of the motors MG1 and MG2 back to the main motor control CPU 262. The master control CPU 272 receives the revolving speeds REV1 and REV2 of the motors MG1 and MG2 as well as a value of electric current IB supplied from the battery 194 to the driving circuits 191 and 192, which are fed back from the main motor control CPU 262.

The battery ECU 230 monitors a state of charge or charge level SOC of the battery 194 and supplies a required value of charging CHreq of the battery 194 to the master control CPU 272 according to the requirements. The master control CPU 272 determines the output of each prime mover by taking into account the required value of charging CHreq. In the case of a requirement for charging, the master control CPU 272 causes the engine 150 to output a greater power than the value required for the drive and distributes part of the output power to the charging operation by means of the first motor MG1.

The brake ECU 220 carries out control to balance a hydraulic brake (not shown) with the regenerative brake by the second motor MG2. This is because the second motor MG2 carries out the regenerative operation to charge the battery 194 in the course of braking the hybrid vehicle of the embodiment. In accordance with a concrete procedure, the brake ECU 220 transmits a required regenerative power REGreq to the master control CPU 272, based on a brake pressure BP measured by the brake sensor 163. The master control CPU 272 specifies the operations of the motors MG1 and MG2 in response to the required regenerative power REGreq and feeds an actual regenerative power REGprac back to the brake ECU 220. The brake ECU 220 regulates the amount of braking by the hydraulic brake to an adequate value, based on the observed brake pressure BP and the difference between the required regenerative power REGreq and the actual regenerative power REGprac.

As described above, the master control CPU 272 determines the outputs of the respective prime movers 150, MG1, and MG2 and transmits the required values to the ECU 240 and the CPUs 264 and 266, which take in charge of the actual controls. The ECU 240 and the CPUs 264 and 266 control the respective prime movers in response to the required values. The hybrid vehicle is accordingly driven with the adequate power output from the axle 112 according to the driving state. In the course of braking, the brake ECU 220 cooperates with the master control CPU 272 to regulate the operations of the respective prime movers and the hydraulic brake. This arrangement attains the desirable braking operation that does not make the driver uneasy or uncomfortable, while allowing regeneration of electric power.

The four CPUs 272, 262, 264, and 266 mutually monitor abnormality in the respective CPUs using watchdog pulses WDP. When some abnormality arises in one CPU to stop the watchdog pulse WDP, a reset signal RES is supplied to the CPU, in order to reset the CPU. Abnormality arising in the master control CPU 272 is also monitored by the power source control circuit 274.

An abnormality record registration circuit 280 includes an EEPROM 282, in which records of the occurrence of abnormality in the accelerator sensor 165 and the gearshift position sensor 167 are registered. An input port of the abnormality record registration circuit 280 receives reset signals RES1 and RES2 transmitted between the master control CPU 272 and the main motor control CPU 262. The abnormality record registration circuit 280 registers the input reset signals RES1 and RES2 into the internal EEPROM 282.

The master control CPU 272 is connected to the abnormality record registration circuit 280 via a bidirectional communication line 214 to mutually transmit various requirements and information. The master control CPU 272 is also connected to the main motor control CPU 262 via a bidirectional communication line 212.

D. Process of Learning Accelerator Opening in First Embodiment

Figure 4:
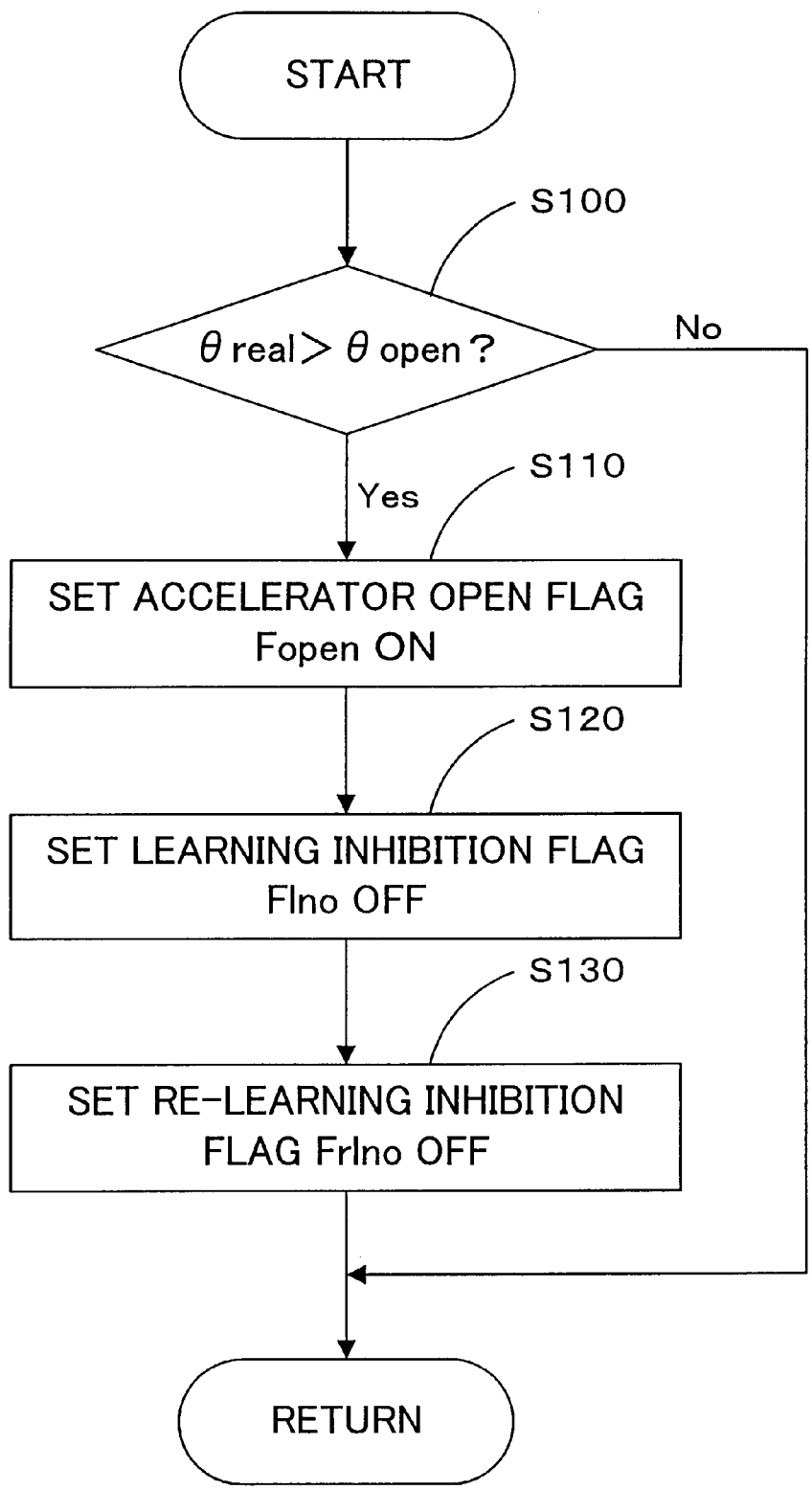
FIG. 4 is a flowchart showing a processing routine executed when observed accelerator opening θ exceeds a reference accelerator opening θopen in a first embodiment.
Figure 5:
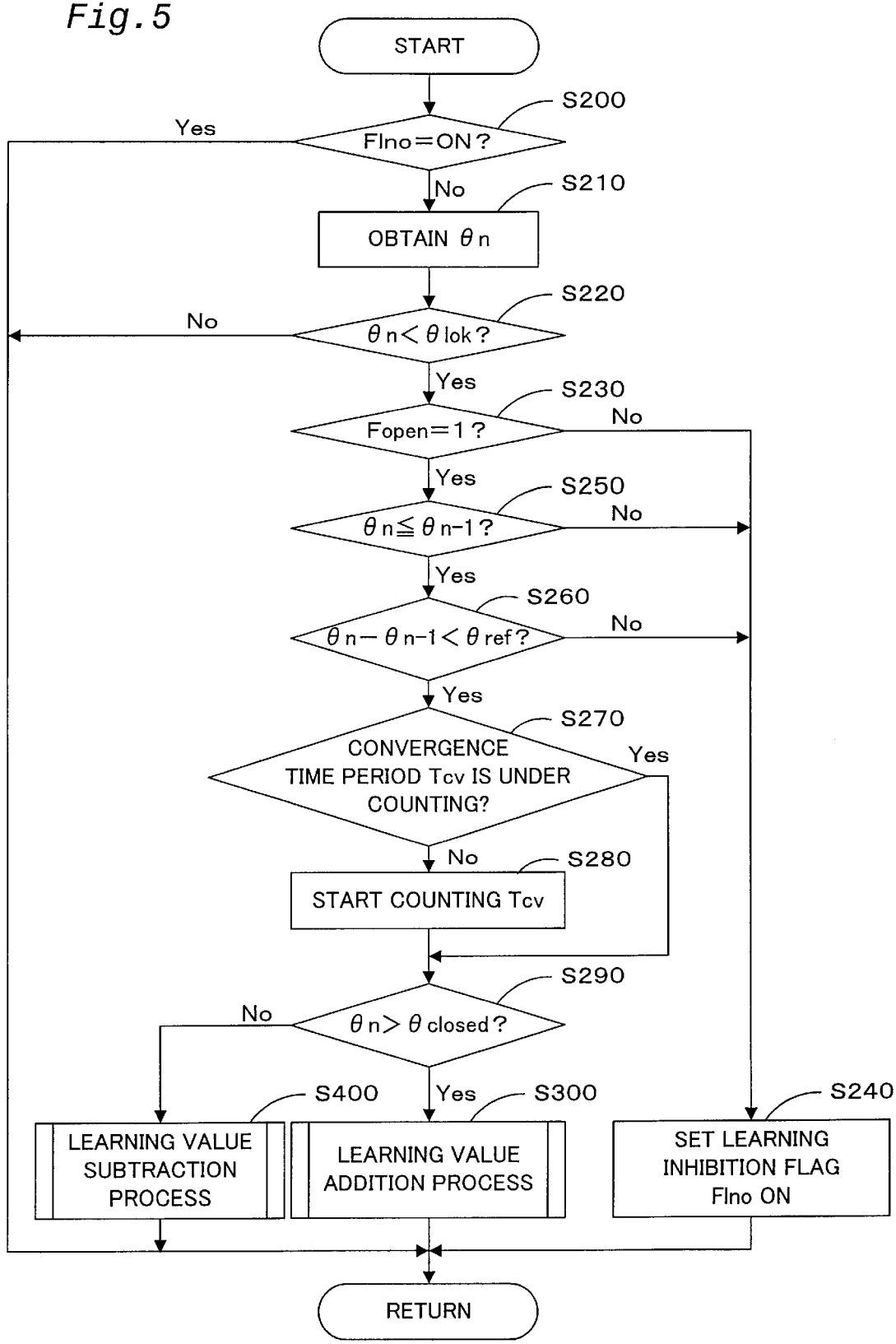
FIG. 5 is a flowchart showing a processing routine executed to learn the full closed position of the accelerator pedal.
Figure 6:
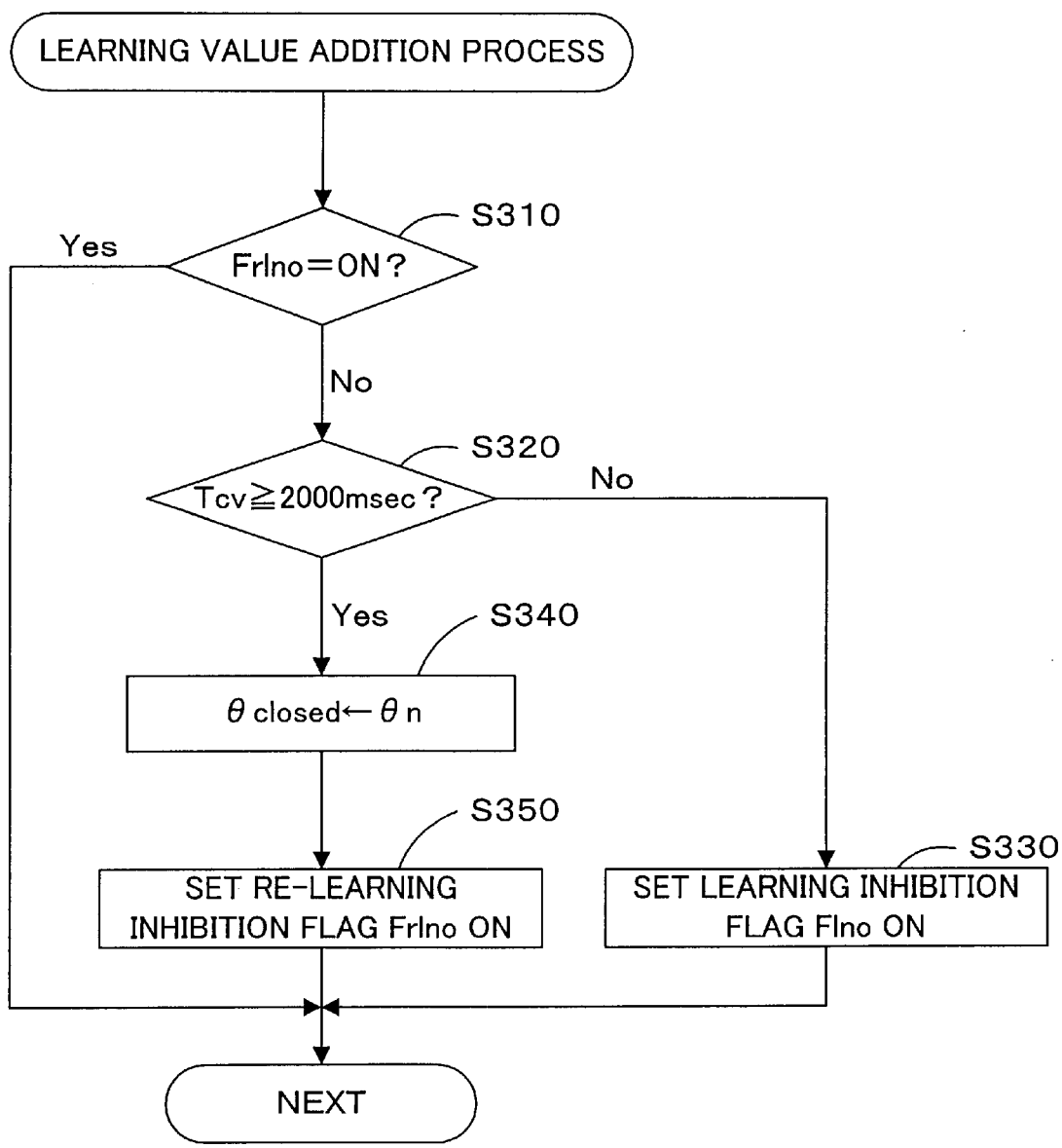
FIG. 6 is a flowchart showing the details of the learning value addition process executed at step S300 in the flowchart of FIG. 5.
Figure 7:
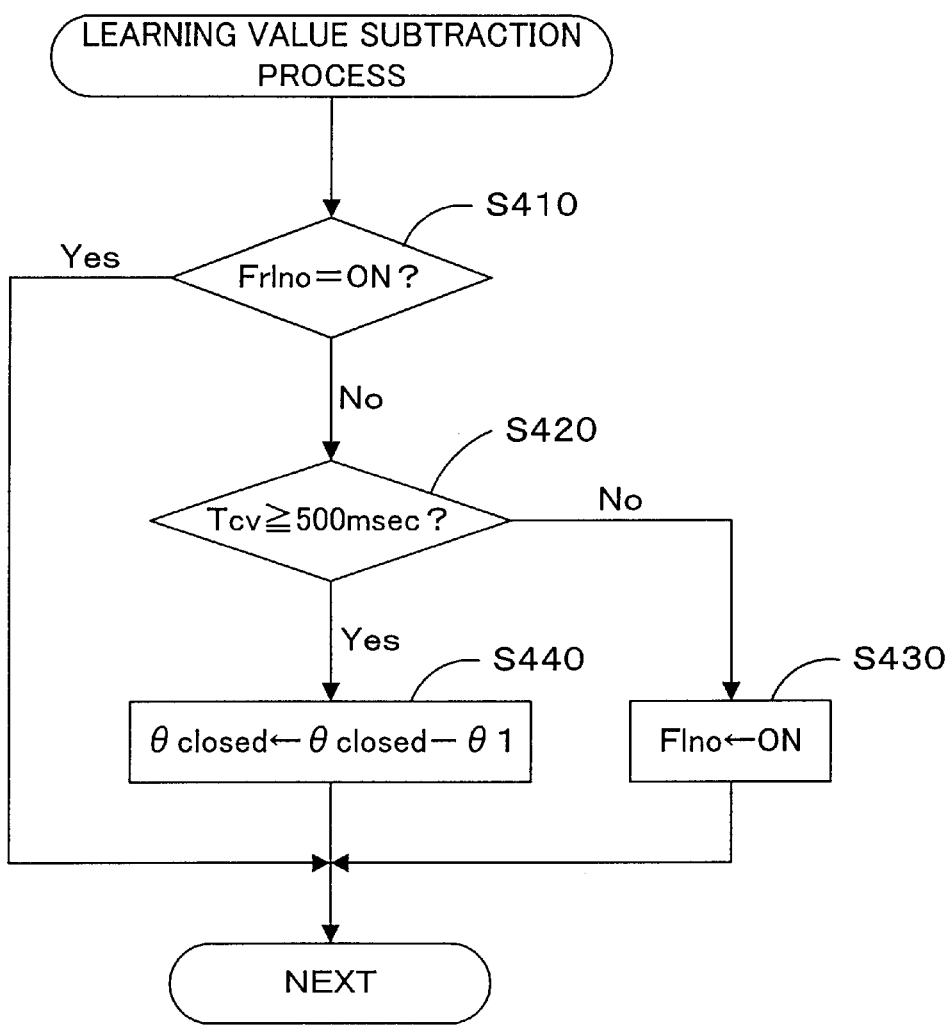
FIG. 7 is a flowchart showing the details of the learning value subtraction process executed at step S400 in the flowchart of FIG. 5.
Figure 8:
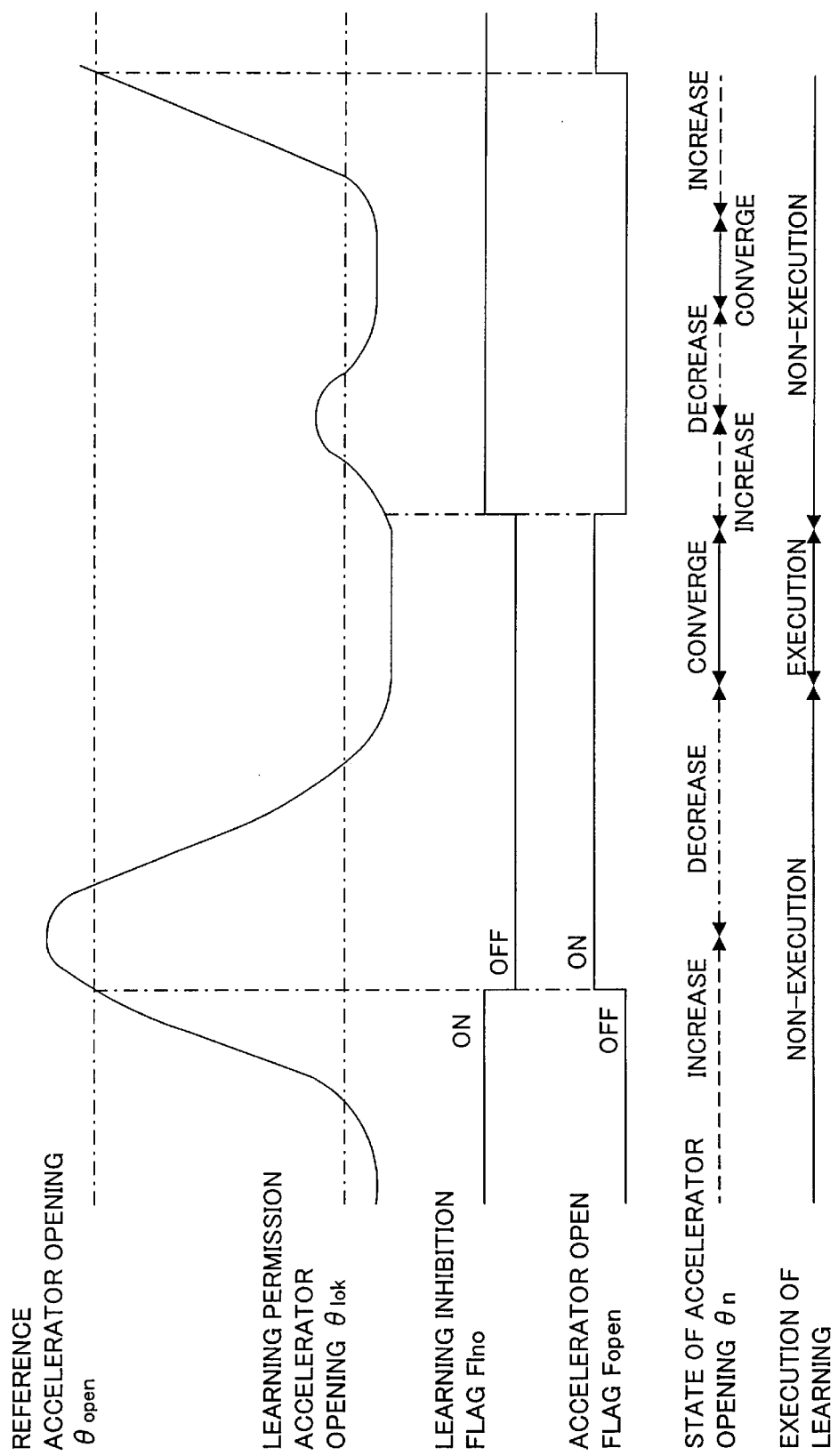
FIG. 8 is a timing chart showing a variation in accelerator opening θn in relation to the respective flags and the learning execution state.
Figure 9:
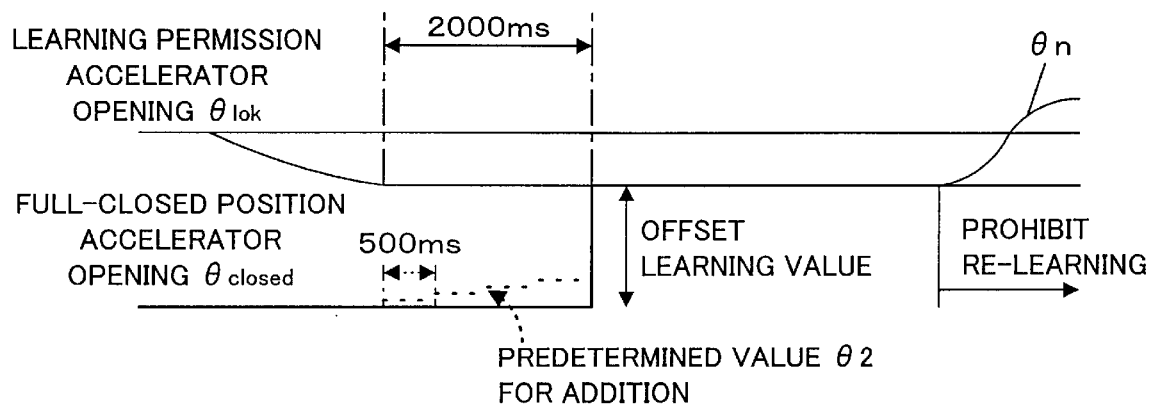
FIG. 9 is a timing chart showing a variation in accelerator opening θn in relation to a full-closed position accelerator opening θclosed in the learning value addition process.
Figure 10:
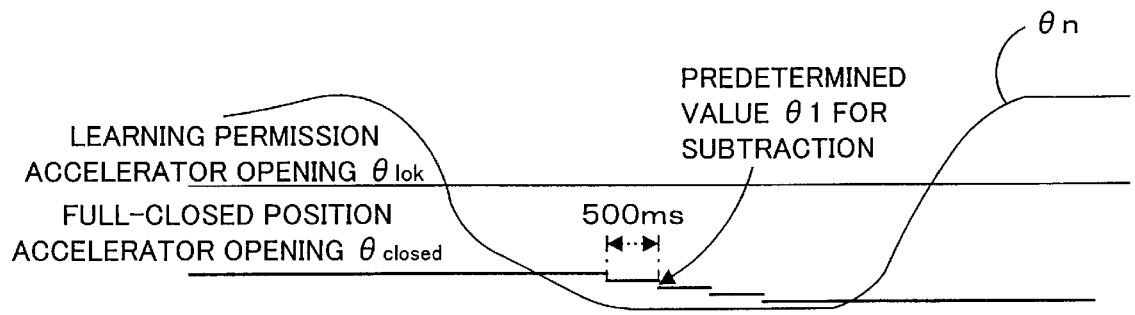
FIG. 10 is a timing chart showing a variation in accelerator opening θn in relation to the full-closed position accelerator opening θclosed in the learning value subtraction process.

The following describes a method of learning the full closed position of the accelerator pedal in a first embodiment with referring to FIGS. 4 through 10. FIG. 4 is a flowchart showing a processing routine executed when observed accelerator opening θ exceeds a reference accelerator opening θopen. FIG. 5 is a flowchart showing a processing routine executed to learn the full closed position of the accelerator pedal. FIG. 6 is a flowchart showing the details of the learning value addition process executed at step S300 in the flowchart of FIG. 5. FIG. 7 is a flowchart showing the details of the learning value subtraction process executed at step S400 in the flowchart of FIG. 5. FIG. 8 is a timing chart showing a variation in accelerator opening θn in relation to the respective flags and the learning execution state. FIG. 9 is a timing chart showing a variation in accelerator opening θn in relation to a full-closed position accelerator opening θclosed in the learning value addition process. FIG. 10 is a timing chart showing a variation in accelerator opening θn in relation to the full-closed position accelerator opening θclosed in the learning value subtraction process.

The description first regards the processing routine executed when the observed accelerator opening θ exceeds the reference accelerator opening θopen with referring to the flowchart of FIG. 4. The master controller 270 of the main ECU 210 carries out the processing routine shown in the flowchart of FIG. 4 at predetermined time intervals, for example, at time intervals of 8 ms, during each drive of the vehicle. When the program enters this processing routine, the master controller 270 first compares a currently observed accelerator opening θreal with a reference accelerator opening θopen at step S100. The reference accelerator opening θopen represents a frequently used accelerator position, which is not readily kept stable in the vicinity of the full closed position of the accelerator pedal in the course of releasing the accelerator pedal. For example, the reference accelerator opening θopen is approximately 30%, when the accelerator opening at the full open position of the accelerator pedal is set equal to 100% and the accelerator opening at the full closed position is set equal to 0%. The arrangement of using the reference value for decision effectively prevents the full closed position of the accelerator pedal from being mistakenly learnt in a range of high accelerator opening θ.

When it is determined at step S100 that the currently observed accelerator opening θreal is not greater than the reference accelerator opening θopen, that is, in the case of a negative answer at step S100, the master controller 270 immediately exits from the current cycle of this processing routine. When it is determined at step S100 that the currently observed accelerator opening θreal is greater than the reference accelerator opening θopen, that is, in the case of an affirmative answer at step S100, on the other hand, the master controller 270 sets an accelerator open flag Fopen ON at step S110 as shown in FIG. 8. This means that the observed accelerator opening θ exceeds the reference accelerator opening θopen. The master controller 270 subsequently sets a learning inhibition flag Flno OFF at step S120 and a relearning inhibition flag Frlno OFF at step S130 as shown in FIG. 8. The program then exits from this processing routine.

The following describes the processing routine carried out to learn the full closed position of the accelerator pedal with referring to the flowcharts of FIGS. 5 through 7. This processing routine is also executed, for example, at the time intervals of 8 ms. When the ignition key position is switched over from OFF position to ON position, the respective flags are set to their initial positions, Flno=ON, Fopen=OFF, and Frlno=ON. When the program enters this processing routine, the master controller 270 first determines whether the learning inhibition flag Flno is ON at step S200. When it is determined at step S200 that the learning inhibition flag Flno is ON, that is, in the case of an affirmative answer at step S200, the master controller 270 immediately exits from the current cycle of this processing routine. As discussed later, the learning inhibition flag Flno is set ON to inhibit learning under the conditions that there is any possibility of learning mistakenly. The learning inhibition flag Flno is ON at the time of starting the vehicle and is set OFF when the observed accelerator opening θ exceeds the reference accelerator opening θopen as described above.

When it is determined at step S200 that the learning inhibition flag Flno is OFF, that is, in the case of a negative answer at step S200, on the other hand, the master controller 270 inputs the observed accelerator opening θ from the accelerator sensor 165 and makes the input observed accelerator opening θ undergo a leveling process to obtain a current accelerator opening θn at step S210. Even when there is some variation in observed accelerator opening θ, for example, due to a noise, the leveling process enables the variation in accelerator opening to satisfy a monotonous decrease condition and accelerates the subsequent processing. In this embodiment, the term 'monotonous decrease' is not restricted to the strict sense that does not allow any increasing variation but means a substantially monotonous decrease that allows minute increasing variations, for example, due to the noise. The master controller 270 compares the obtained current accelerator opening θn with a learning permission accelerator opening θlok at step S220. When it is determined at step S220 that the current accelerator opening θn is not less than the learning permission accelerator opening θlok, that is, in the case of a negative answer at step S220, the master controller 270 immediately exits from the current cycle of this processing routine.

When it is determined at step S220 that the current accelerator opening θn is less than the learning permission accelerator opening θlok, that is, in the case of an affirmative answer at step S220, on the other hand, the master controller 270 determines whether the accelerator open flag Fopen is set ON at step S230. When it is determined at step S230 that the accelerator open flag Fopen is not ON, that is, in the case of a negative answer at step S230, the master controller 270 sets the learning inhibition flag Flno ON at step S240 as shown in FIG. 8. This is because the procedure of this embodiment does not give the permission to learn unless the accelerator opening θ once exceeds the frequently used reference accelerator opening θopen, in order to prevent learning from being performed mistakenly as discussed previously.

When it is determined at step S230 that the accelerator open flag Fopen is ON, that is, in the case of an affirmative answer at step S230, on the other hand, the master controller 270 compares the current accelerator opening θn with a previous accelerator opening θn−1 at step S250. When it is determined at step S250 that the current accelerator opening θn is greater than the previous accelerator opening θn−1, that is, in the case of a negative answer at step S250, the master controller 270 sets the learning inhibition flag Flno ON at step S240. This is because the procedure of this embodiment gives the permission to learn only when the accelerator opening θ monotonously decreases. Here the term 'monotonously decreasing' means that the accelerator opening θn output from the accelerator sensor 165 continuously decreases or that the current accelerator opening θn is continuously kept equal to the previous accelerator opening θn−1. Learning is discontinued or inhibited once the current accelerator opening θn exceeds the previous accelerator opening θn−1.

When it is determined at step S250 that the current accelerator opening θn is not greater than the previous accelerator opening θn−1 and that the accelerator opening θ monotonously decreases as shown in FIG. 8, that is, in the case of an affirmative answer at step S250, the master controller 270 compares a difference between the current accelerator opening θn and the previous accelerator opening θn−1 with a convergence reference accelerator opening θref at step S260. This process determines whether the accelerator opening θn output from the accelerator sensor 165 is converging as shown in FIG. 8. When it is determined at step S260 that the difference between the current accelerator opening θn and the previous accelerator opening θn−1 is not less than the convergence reference accelerator opening θref, that is, in the case of a negative answer at step S260, the master controller 270 sets the learning inhibition flag Flno ON at step S240.

When it is determined at step S260 that the difference between the current accelerator opening θn and the previous accelerator opening θn−1 is less than the convergence reference accelerator opening θref, that is, in the case of an affirmative answer at step S260, the master controller 270 determines that the accelerator opening θn is converging, and determines whether a convergence time period Tcv is under counting at step S270. When the convergence time period Tcv is not under counting, that is, in the case of a negative answer at step S270, the master controller 270 starts counting the convergence time period Tcv at step S280. When the convergence time period Tcv is under counting, that is, in the case of an affirmative answer at step S270, on the other hand, the counting is to be continued.

The master controller 270 then compares the current accelerator opening θn with a current full-closed position accelerator opening θclosed at step S290. When it is determined at step S290 that the current accelerator opening θn is greater than the current full-closed position accelerator opening θclosed, that is, in the case of an affirmative answer at step S290, the master controller 270 carries out a learning value addition process at step S300. The learning value addition process increments the full-closed position accelerator opening that corresponds to the full closed position of the accelerator pedal 166. When it is determined at step S290 that the current accelerator opening θn is not greater than the current full-closed position accelerator opening θclosed, that is, in the case of a negative answer at step S90, on the other hand, the master controller 270 carries out a learning value subtraction process at step S400. The learning value subtraction process decrements the full-closed position accelerator opening that corresponds to the full closed position of the accelerator pedal 166. The details of the learning value addition process and the learning value subtraction process are discussed below.

The learning value addition process is discussed first with referring to FIGS. 6 and 9. The master controller 270 determines whether a re-learning inhibition flag Frlno is set ON at step S310. The re-learning inhibition flag Frlno will be described later. When it is determined at step S310 that the re-learning inhibition flag Frlno is set ON, that is, in the case of an affirmative answer at step S310, the master controller 270 immediately exits from the current cycle of the learning value addition process. When it is determined at step S310 that the re-learning inhibition flag Frlno is OFF, that is, in the case of a negative answer at step S310, on the other hand, the master controller 270 subsequently determines whether a convergence time period Tcv is not less than 2000 ms at step S320. The procedure of this embodiment performs the offset learning and sets the converged value of the accelerator opening θ to the new full-closed position accelerator opening θclosed in the case of learning and updating the full-closed position accelerator opening θclosed to a higher value. For such offset learning, the convergence time period Tcv should be sufficiently long.

When it is determined at step S320 that the convergence time period Tcv is less than 2000 ms, that is, in the case of a negative answer at step S320, the master controller 270 sets the learning inhibition flag Flno ON at step S330 and exits from the learning value addition process. Once the converging state of the accelerator opening θ is discontinued, even when the accelerator opening θn again becomes less than the learning permission accelerator opening θlok as shown in FIG. 8, the procedure of this embodiment prohibits the subsequent learning operation, in order to prevent the accelerator opening from being learnt mistakenly. When it is determined at step S320 that the convergence time period Tcv is not less than 2000 ms, that is, in the case of an affirmative answer at step S320, the master controller 270 sets the converged value of the accelerator opening θ to the new full-closed position accelerator opening θclosed at step S340 as shown in FIG. 9. The master controller 270 then sets the relearning inhibition flag Frlno ON at step S350 as shown in FIG. 9, and exits from the learning value addition process.

The following gives the reason why the re-learning inhibition flag Frlno is set ON. Updating the full-closed position accelerator opening θclosed to a higher value worsens the output response to the operation of the accelerator pedal. The technique of this embodiment accordingly sets the converged value of the accelerator opening θ to the new full-closed position accelerator opening θclosed. Compared with the prior art technique that sets a value obtained by the leveling process to the new full-closed position accelerator opening θclosed, this procedure enhances the learning accuracy and the learning speed. This procedure, however, causes the difference between the current full-closed position accelerator opening and the new full-closed position accelerator opening (that is, the learning value) to be relatively large. In order to prevent the accelerator opening from being mistakenly learnt, the procedure prohibits re-learning in both the addition process and the subtraction process as long as the accelerator opening θ again exceeds the reference accelerator opening θopen.

The learning value subtraction process is then discussed with referring to FIGS. 7 and 10. The master controller 270 first determines whether the re-learning inhibition flag Frlno is set ON at step S410. When it is determined at step S410 that the re-learning inhibition flag Frlno is set ON, that is, in the case of an affirmative answer at step S410, the master controller 270 immediately exits from the current cycle of the learning value subtraction process. When it is determined at step S410 that the relearning inhibition flag Frlno is OFF, that is, in the case of a negative answer at step S410, on the other hand, the master controller 270 subsequently determines whether a convergence time period Tcv is not less than 500 ms at step S420. This is because the procedure of this embodiment learns and updates the full-closed position accelerator opening θclosed when the observed accelerator opening θ is kept for a time period of or over 500 ms. When it is determined at step S420 that the convergence time period Tcv is less than 500 ms, that is, in the case of a negative answer at step S420, the master controller 270 sets the learning inhibition flag Flno ON at step S430 as shown in FIG. 8. The program then exits from the learning value subtraction process. Once the converging state of the accelerator opening θ is discontinued, even when the accelerator opening θn again becomes less than the learning permission accelerator opening θlok, the procedure of this embodiment prohibits the subsequent learning operation, in order to prevent the accelerator opening from being learnt mistakenly.

When it is determined at step S420 that the convergence time period Tcv is not less than 500 ms, that is, in the case of an affirmative answer at step S420, on the other hand, the master controller 270 sets a remainder obtained by subtracting a predetermined value θ1 from the current full-closed position accelerator opening θclosed to the new full-closed position accelerator opening θclosed at step S440 as shown in FIG. 10. The program then exits from the learning value subtraction process. As long as the converging state continues, at the time point when another 500 ms has elapsed as the convergence time period Tcv, the predetermined value θ1 is again subtracted from the full-closed position accelerator opening θclosed as shown in FIG. 10. Updating the full-closed position accelerator opening θclosed to a lower value may cause a power requirement signal to be output during a drive of the vehicle, although the accelerator pedal 166 is actually set at the mechanical full closed position. In order to prevent such potential troubles, the technique of the embodiment sets the remainder obtained by subtracting the predetermined value 61 from the current full-closed position accelerator opening θclosed to the new full-closed position accelerator opening θclosed, regardless of the actual learning value.

As described above, in the technique of the first embodiment, one of the conditions for giving a permission to learn is that the accelerator opening θ once exceeds the frequently used reference accelerator opening θopen. The permission to learn is accordingly given only when the accelerator pedal 166 is returned from a relatively deep position of depression to the full closed position. Namely learning is carried out after the accelerator lever of the accelerator sensor 165 is turned by a significant angle. This arrangement effectively reduces the possibility of mistakenly measuring the accelerator opening. It is generally difficult to keep the accelerator position in the vicinity of the full closed position after the driver steps on the accelerator pedal 166 to a significant depth. This arrangement thus prevents the accelerator opening from being mistakenly learnt while the driver depresses the accelerator pedal 166 unintentionally.

In the technique of the first embodiment, another condition for giving the permission to learn is that the accelerator opening θn obtained by the leveling process monotonously decreases and is converged to a fixed value. This gives the strict learning start condition and enables the use of a relatively large learning value, thus enhancing the learning accuracy, compared with the prior art technique. The requirement of the monotonous decrease in accelerator opening θn causes learning to be prohibited in the case where any peak signal is observed, for example, due to a nose. This arrangement eliminates the effects of the noise in the process of learning the full-closed position accelerator opening θclosed, thus effectively preventing the accelerator opening from being mistakenly learnt.

In the case where the full-closed position accelerator opening θclosed is updated to a higher value as shown in FIG. 9, the technique of the embodiment carries out the offset learning, which specifies the real difference between the current full-closed position accelerator opening θclosed and the converged value of the accelerator opening θn as the learning value (offset learning value) and sets the converged value of the accelerator opening θn to the new full-closed position accelerator opening θclosed. This procedure quickly changes the full-closed position accelerator opening θclosed used for the purpose of control to the actual full-closed position accelerator opening. In general, when the full-closed position accelerator opening θclosed is updated to a higher value, the erroneous learning only results in increasing the play of the accelerator pedal 166, that is, lowering the response to the operation of the accelerator pedal 166. This lowers the drivability but does not make the vehicle run against the intention of the driver.

By taking into account these facts, the procedure of this embodiment carries out the offset learning when updating the full-closed position accelerator opening θclosed to a higher value. Although the effects by the erroneous learning are not so significant, the erroneous learning is still an abnormal state. The procedure of the embodiment thus gives a permission to re-learn only when the converging state continues for the time period of at least 2000 ms prior to the update of the full-closed position accelerator opening θclosed and when the accelerator opening θ again exceeds the reference accelerator opening θopen. This arrangement effectively prevents the accelerator opening from being learnt mistakenly.

E. Process of Learning Accelerator Opening in Second Embodiment

Figure 11:
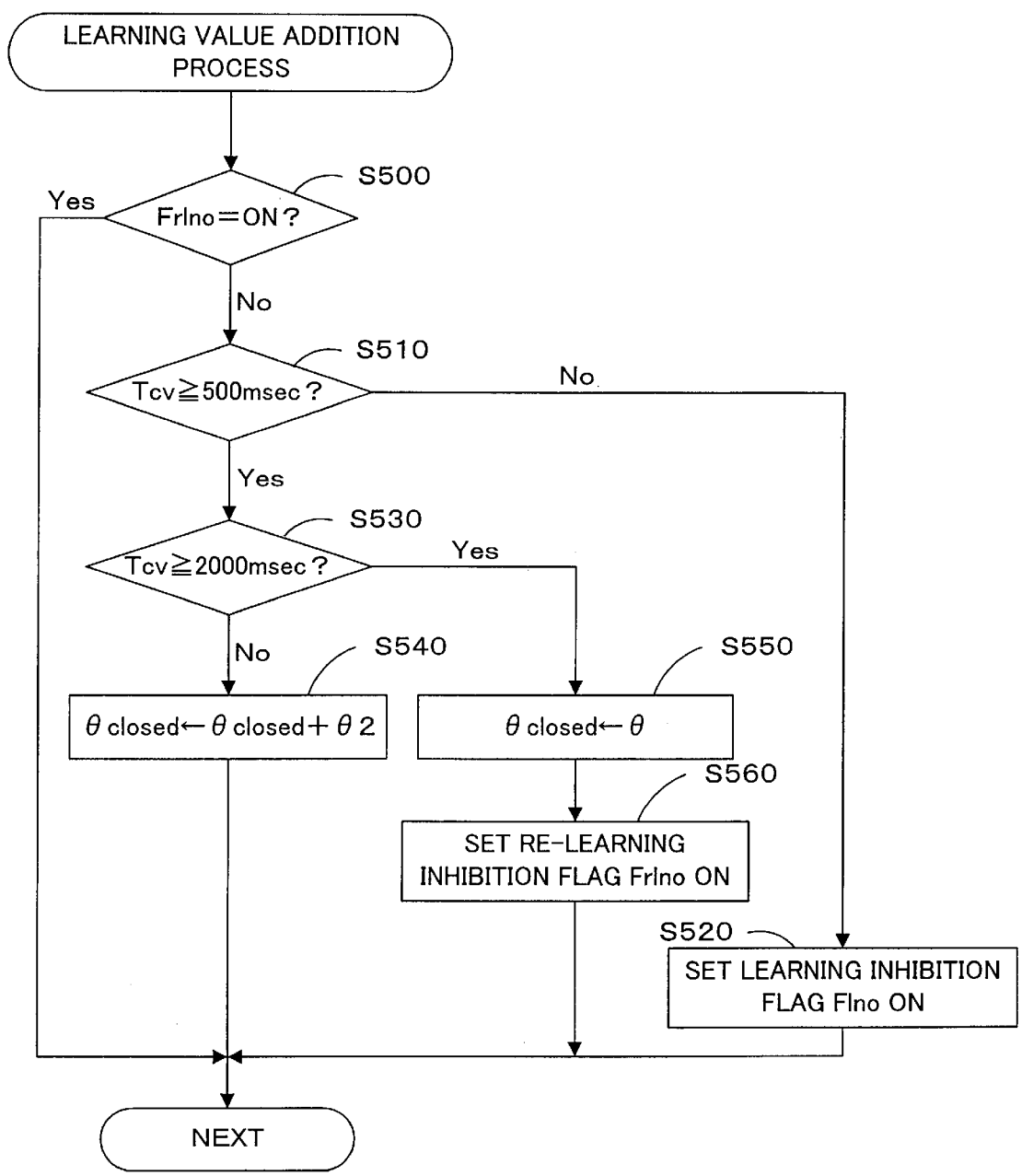
FIG. 11 is a flowchart showing another processing routine of the learning value addition process in a second embodiment.

The procedure of the first embodiment carries out only the offset learning in the learning value addition process when the convergence time period Tcv continues at least 2000 ms. Another available procedure updates the full-closed position accelerator opening θclosed by adding a predetermined value, and eventually carries out the offset learning. This procedure is discussed below as a second embodiment of the present invention with reference to FIG. 11. FIG. 11 is a flowchart showing another processing routine of the learning value addition process carried out in the second embodiment. The series of processing in the second embodiment other than the leaning value addition process is identical with that in the first embodiment and is thus not specifically described here.

The processing routine of FIG. 11 is executed, for example, at time intervals of 8 ms. When the program enters this processing routine, the master controller 270 first determines whether the re-learning inhibition flag Frlno is set ON at step S500. When it is determined at step S500 that the relearning inhibition flag Frlno is set ON, that is, in the case of an affirmative answer at step S500, the master controller 270 immediately exits from the current cycle of the learning value addition process. When it is determined at step S500 that the relearning inhibition flag Frlno is OFF, that is, in the case of a negative answer at step S500, on the other hand, the master controller 270 subsequently determines whether a convergence time period Tcv is not less than 500 ms at step S510. The procedure of this embodiment carries out the learning process to add a predetermined value θ2 when the converging state continues for the time period of 500 ms. The processing of step S510 accordingly determines whether such learning is to be carried out.

When it is determined at step S510 that the convergence time period is less than 500 ms, that is, in the case of a negative answer at step S510, the master controller 270 sets the learning inhibition flag Flno ON at step S520 and exits from the learning value addition process. Once the converging state of the accelerator opening θ is discontinued, the procedure prohibits the subsequent learning and thereby prevents the accelerator opening from being learnt mistakenly. When it is determined at step S510 that the convergence time period is not less than 500 ms, that is, in the case of an affirmative answer at step S510, on the other hand, the master controller 270 subsequently determines whether the convergence time period Tcv is not less than 2000 ms at step S530. This time period is set as the time condition for the offset learning as discussed in the first embodiment.

When it is determined at step S530 that the convergence time period Tcv is less than 2000 ms, that is, in the case of a negative answer at step S530, the master controller 270 sets a sum obtained by adding a predetermined value θ2 to the current full-closed position accelerator opening θclosed to the new full-closed position accelerator opening θclosed at step S540 as shown by the broken line in FIG. 9. The program then exits from the learning value addition process. Under such conditions, while the convergence time period Tcv of the accelerator opening θn is insufficient for the execution of the offset learning, the convergence time period Tcv is sufficient for the addition of the predetermined value.

When it is determined at step S530 that the convergence time period Tcv is not less than 2000 ms, that is, in the case of an affirmative answer at step S530, on the other hand, the master controller 270 sets the converged value of the accelerator opening θ to the new full-closed position accelerator opening θclosed at step S550 as shown by the thick solid line in FIG. 9. The master controller 270 then sets the re-learning inhibition flag Frlno ON at step S560 and exits from the processing routine.

The technique of the second embodiment has the following advantages, in addition to the advantages of the first embodiment. The procedure of the second embodiment sets the sum obtained by adding the predetermined value θ2 to the current full-closed position accelerator opening θclosed to the new full-closed position accelerator opening θclosed at the time point when the convergence time period Tcv reaches or exceeds 500 ms, prior to the execution of the offset learning. Even when the convergence time period Tcv does not reach 2000 ms and the offset learning can not be performed, this arrangement ensures some update of the current full-closed position accelerator opening θclosed. As shown in FIG. 9, the procedure of the second embodiment cancels the difference between the current full-closed position accelerator opening θclosed used for the purpose of control and the actual full-closed position accelerator opening by at least the predetermined value θ2.

The apparatus for learning the full closed position of the accelerator pedal and the method of the same according to the present invention are discussed above with reference to some preferred embodiments. These embodiments are, however, to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

Some examples of possible modification are briefly discussed. The procedure of the embodiment discussed above carries out the offset learning or the learning with the predetermined value θ2 in the learning value addition process and the learning with the predetermined value θ1 in the learning value subtraction process. One modified procedure uses a learning value obtained by making the difference between the full-closed position accelerator opening θclosed and the converged value of the accelerator opening θ undergo the leveling process. This method enhances the learning accuracy in the process of adding the learning value.

Figure 12:
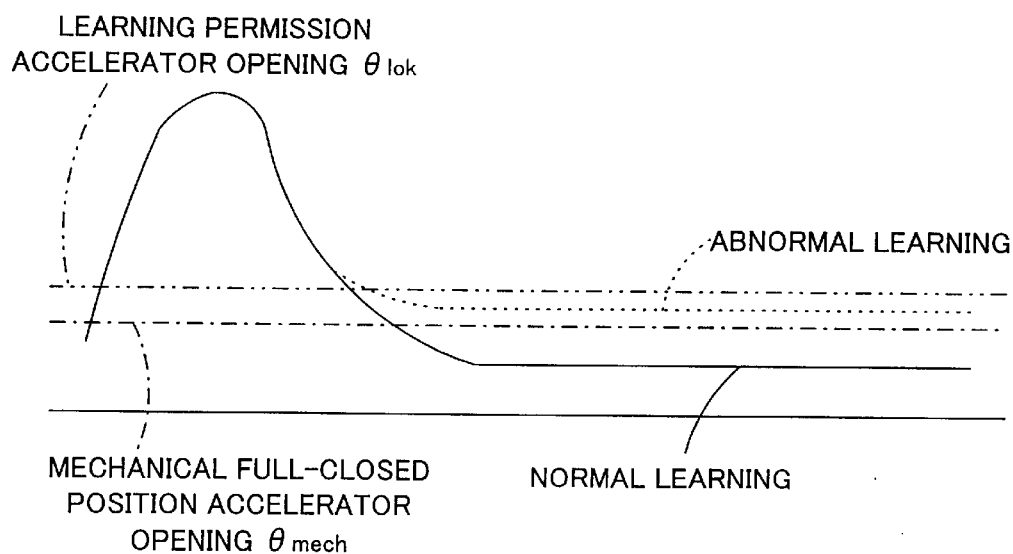
FIG. 12 shows a comparison between normal learning and abnormal learning.

Another modified procedure utilizes the updated full-closed position accelerator opening θclosed obtained in either of the above embodiments for a failure detection of the accelerator pedal. The failure detection is discussed briefly with referring to FIG. 12. FIG. 12 shows a comparison between normal learning and abnormal learning. The accelerator pedal has a mechanical full-closed position accelerator opening θmech at the mechanical full closed position as shown in FIG. 3. The mechanical full-closed position accelerator opening θmech is smaller than the learning permission accelerator opening θlok. When the full-closed position accelerator opening θclosed is greater than the mechanical full-closed position accelerator opening θmech (that is, in the state of abnormal learning shown by the broken line in FIG. 12), the procedure lights an alarm lamp on and informs the driver of occurrence of an abnormality on the accelerator pedal 166, while continuing the learning process. This arrangement informs the driver of the occurrence of some abnormality on the accelerator pedal 166, while continuing the drive of the vehicle and the process of learning the full-closed position of the accelerator pedal 166, since this state does not cause any troubles in the drive of the vehicle or in the process of learning the full closed position of the accelerator pedal 166. This informs the driver of the necessity of inspection without stopping the drive of the vehicle. A possible example of the abnormality on the accelerator pedal 166 is malfunction of a return spring.

The procedure of the above embodiment gives the permission to learn only when the currently observed accelerator opening θn is not greater than the previous accelerator opening θn−1. One possible modification gives the permission to learn when the absolute difference between the currently observed accelerator opening θn and the previous accelerator opening θn−1 is within a preset range.

The time periods 500 ms and 2000 ms used as the criterion of the convergence time period Tcv in the above embodiments are only examples. Any other suitable time periods may be used as the criterion.

Figure 13:
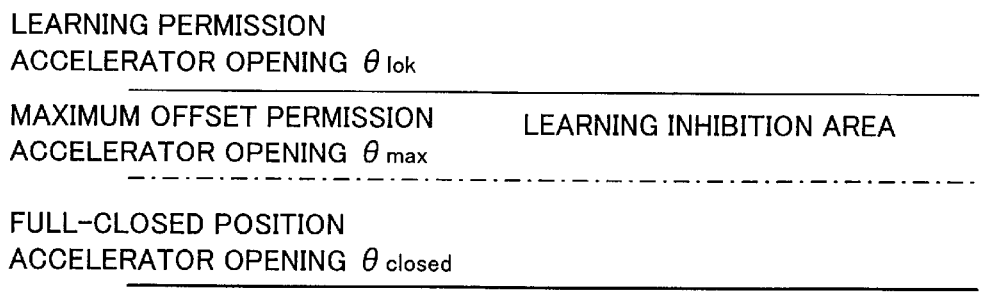
FIG. 13 shows the state of accelerator opening in the case of applying a maximum offset permission accelerator opening θmax for offset learning.

Another modified procedure estimates a maximum variation in accelerator opening from the previous learning value and sets the estimated maximum variation as a maximum offset permission accelerator opening θmax shown by the one-dot chain line in FIG. 13 in the process of performing the offset learning. This procedure sets the maximum offset permission accelerator opening θmax to the learning value when the offset accelerator opening exceeds the maximum offset permission accelerator opening θmax. This reduces the possibility of mistakenly learning the accelerator opening.

In the embodiments discussed above, the depression or step-on amount of the accelerator pedal 166 is measured by the accelerator sensor 165. When the accelerator pedal 166 is mechanically linked with the throttle valve 168, the depression amount of the accelerator pedal 166 may alternatively be measured by the throttle sensor 169. This is because the depression amount of the accelerator pedal 166 directly affects the opening of the throttle valve 168 in the structure where the accelerator pedal 166 is mechanically linked with the throttle valve 168.

The above embodiments regard the hybrid vehicle as an example. The technique of the present invention may also be applicable for vehicles with only an engine as well as for vehicles with only a motor. In any of these vehicles, it is essential to learn the accurate full closed position of the accelerator pedal since the desired output value required by the driver is transmitted to the controller via the accelerator pedal.

The scope and spirit of the present invention are indicated by the appended claims, rather than by the foregoing description.

What is claimed is:

1. A full-closed position learning apparatus that learns a full closed position of an accelerator pedal in a released state, the full-closed position learning apparatus comprising:
    an accelerator depression measurement unit that measures a depression amount of the accelerator pedal as an operational opening;
    a first storage unit that registers therein an accelerator open record when the observed operational opening exceeds an open record reference value;

a learning permission decision unit that determines whether the observed operational opening is less than a learning permission reference value, which is smaller than the open record reference value;

an opening convergence decision unit that determines whether the operational opening is converging when it is determined that the observed operational opening is less than the learning permission reference value while the accelerator open record is present in the first storage unit; and a full-closed position opening variation unit that varies the operational opening at the full closed position to a new full-closed position operational opening by taking into account the converged operational opening, when it is determined that the operational opening is converging.

2. A full-closed position learning apparatus in accordance with claim 1, the full-closed position learning apparatus further comprising:

a decreasing state decision unit that determines whether the operational opening monotonously decreases, when the accelerator open record is present in the first storage unit, wherein the opening convergence decision unit carries out the determination of whether the operational opening is converging when it is determined that the operational opening monotonously decreases.

3. A full-closed position learning apparatus in accordance with claim 2, wherein the decreasing state decision unit determines that the operational opening monotonously decreases when an absolute difference between a currently observed operational opening and a previous operational opening is within a preset range and when a future operational opening after elapse of a predetermined time period is smaller than the currently observed operational opening.

4. A full-closed position learning apparatus in accordance with claim 2, wherein the decreasing state decision unit determines that the operational opening monotonously decreases when a currently observed operational opening is smaller than a previous operational opening.

5. A full-closed position learning apparatus in accordance with claim 1, wherein the opening convergence decision unit determines that the operational opening is converging when a variation in operational opening is within a predetermined range.

6. A full-closed position learning apparatus in accordance with claim 1, wherein the opening convergence decision unit determines that the operational opening is converging when a currently observed operational opening is either of identical with a previous operational opening and less than the previous operational opening by a predetermined rate.

7. A full-closed position learning apparatus in accordance with claim 1, wherein the full-closed position opening variation unit sets a remainder obtained by subtracting a predetermined value from a current full-closed position operational opening to the new full-closed position operational opening, when the current full-closed position operational opening is greater than the converged operational opening.

8. A full-closed position learning apparatus in accordance with claim 1, wherein the full-closed position opening variation unit sets a sum obtained by adding a predetermined value to a current full-closed position operational opening to the new full-closed position operational opening, when the current full-closed position operational opening is not greater than the converged operational opening.

9. A full-closed position learning apparatus in accordance with claim 8, wherein the full-closed position opening variation unit sets the converged operational opening to the new full-closed position operational opening when the convergence of the operational opening continues for a predetermined time period.

10. A full-closed position learning apparatus in accordance with claim 1, wherein the full-closed position opening variation unit sets the converged operational opening to the new full-closed position operational opening when a current full-closed position operational opening is not greater than the converged operational opening.

11. A full-closed position learning apparatus in accordance with claim 1, the full-closed position learning apparatus further comprising: an accelerator abnormality decision unit that compares the new full-closed position operational opening with the learning permission reference value and with a mechanical full closing value, which is smaller than the learning permission reference value and corresponds to a mechanical full closed position of the accelerator pedal; and an information unit that informs a driver of occurrence of an abnormality on the accelerator pedal when the new full-closed position operation opening is less than the learning permission reference value but is greater than the mechanical full closing value.

12. A full-closed position learning apparatus in accordance with claim 1, wherein the accelerator depression measurement unit comprises an accelerator opening sensor that measures the depression amount of the accelerator pedal as an accelerator opening.

13. A full-closed position learning apparatus in accordance with claim 1, wherein the accelerator depression measurement unit comprises a throttle opening sensor that measures an operation amount of a throttle value, which works in combination with an operation of the accelerator pedal, as a throttle opening.

14. A method of successively updating a full-closed position output value of an accelerator pedal at a full closed position corresponding to a specific state in which an operating quantity of the accelerator pedal is equal to zero, the method comprising:

determining whether an output value of the accelerator pedal is less than a threshold value;

when it is determined that the output value of the accelerator pedal is less than the threshold value, determining whether the output value of the accelerator pedal is converging;

when it is determined that the output value of the accelerator pedal is converging, comparing a current full-closed position output value of the accelerator pedal with the converged output value of the accelerator pedal;

when the current full-closed position output value of the accelerator pedal is greater than the converged output value of the accelerator pedal, setting a mean of the current full-closed position output value of the accelerator pedal and the converged output value of the accelerator pedal to a new full-closed position output value of the accelerator pedal; and when the current full-closed position output value of the accelerator pedal is not greater than the converged output value of the accelerator pedal, setting the converged output value of the accelerator pedal to the new full-closed position output value of the accelerator pedal.

15. A method in accordance with claim 14, wherein, when the current full-closed position output value of the accelerator pedal is not greater than the converged output value of the accelerator pedal, the mean of the current full-closed position output value of the accelerator pedal and the converged output value of the accelerator pedal is set to the new full-closed position output value of the accelerator pedal, when a convergence time period, in which the output value of the accelerator pedal converges, exceeds a preset time period, the converged output value of the accelerator pedal being set to the new full-closed position output value of the accelerator pedal.

16. A method in accordance with claim 15, the output value of the accelerator pedal is obtained as either one of an accelerator opening or a throttle opening that is related to a depression amount of the accelerator pedal.

17. A method of learning a full-closed position output value at a full closed position of an accelerator pedal disposed in a vehicle, the accelerator pedal enabling a required output value to be output to a driving power source of the vehicle in a continuously variable manner and having the full closed position that corresponds to a required output value of 0, the method comprising:

determining whether an output value of the accelerator pedal has exceeded a first threshold value;

determining whether the output value of the accelerator pedal is less than a second threshold value, which is smaller than the first threshold value, after the output value of the accelerator pedal has exceeded the first threshold value;

when it is determined that the output value of the accelerator pedal is less than the second threshold value, determining whether the output value of the accelerator pedal is converging; and when it is determined that the output value of the accelerator pedal is converging, changing the full-closed position output value with taking into account the converged output value of the accelerator pedal.

18. A method in accordance with claim 17, wherein determining whether the output value of the accelerator pedal is converging is carried out when the output value of the accelerator pedal monotonously decreases.

19. A method in accordance with claim 17, wherein it is determined that the output value of the accelerator pedal monotonously decreases when an absolute difference between a currently observed output value of the accelerator pedal and a previous output value of the accelerator pedal is within a preset range and when a future output value of the accelerator pedal after elapse of a predetermined time period is smaller than the currently observed output value of the accelerator pedal.

20. A method in accordance with claim 17, wherein it is determined that the output value of the accelerator pedal monotonously decreases when a currently observed output value of the accelerator pedal is smaller than a previous output value of the accelerator pedal.

21. A method in accordance with claim 17, wherein determining whether the output value of the accelerator pedal is converging is carried out when a current full-closed position output value is greater than a currently observed output value of the accelerator pedal, determining whether the output value of the accelerator pedal is converging carrying out on the condition that the output value of the accelerator pedal monotonously decreases, when the current full-closed position output value is not greater than the currently observed output value of the accelerator pedal.

22. A method in accordance with claim 1, wherein it is determined that the output value of the accelerator pedal is converging when a variation in output value of the accelerator pedal is within a predetermined range.

23. A method in accordance with claim 1, wherein it is determined that the output value of the accelerator pedal is converging when a currently observed output value of the accelerator pedal is either of identical with a previous output value of the accelerator pedal and less than the previous output value of the accelerator pedal by a predetermined rate.

24. A method in accordance with claim 1, wherein, when a current full-closed position output value is greater than the converged output value of the accelerator pedal, a remainder obtained by subtracting a predetermined value from the current full-closed position output value is set to the new full-closed position output value.

25. A method in accordance with claim 1, wherein, when a current full-closed position output value is not greater than the converged output value of the accelerator pedal, a sum obtained by adding a predetermined value to the current full-closed position output value is set to the new full-closed position output value.

26. A method in accordance with claim 25, wherein, when the convergence of the output value of the accelerator pedal continues for a predetermined time period, the converged output value of the accelerator pedal is set to the new full-closed position output value.

27. A method in accordance with claim 1, wherein, when a current full-closed position output value is not greater than the converged output value of the accelerator pedal, the converged output value of the accelerator pedal is set to the new full-closed position output value.

28. A method in accordance with claim 1, wherein the output value of the accelerator pedal is expressed by an accelerator opening that is related to a depression amount of the accelerator pedal, the accelerator opening being a predetermined percent at a maximum output value of the accelerator pedal and being zero percent at a minimum output value of the accelerator pedal.

29. A method in accordance with claim 1, wherein the output value of the accelerator pedal is expressed by a throttle opening that is related to a depression amount of the accelerator pedal, the throttle opening being a predetermined percent at a maximum output value of the accelerator pedal and being zero percent at a minimum output value of the accelerator pedal.

30. A method in accordance with claim 1, the method further comprising: informing a driver of occurrence of an abnormality on the accelerator pedal when the new full-closed position output value is smaller than the second threshold value but greater than a third threshold value, which is smaller than the second threshold value and corresponds to a mechanical full closed position of the accelerator pedal.

* * * * *